Patented Nov. 10, 1953

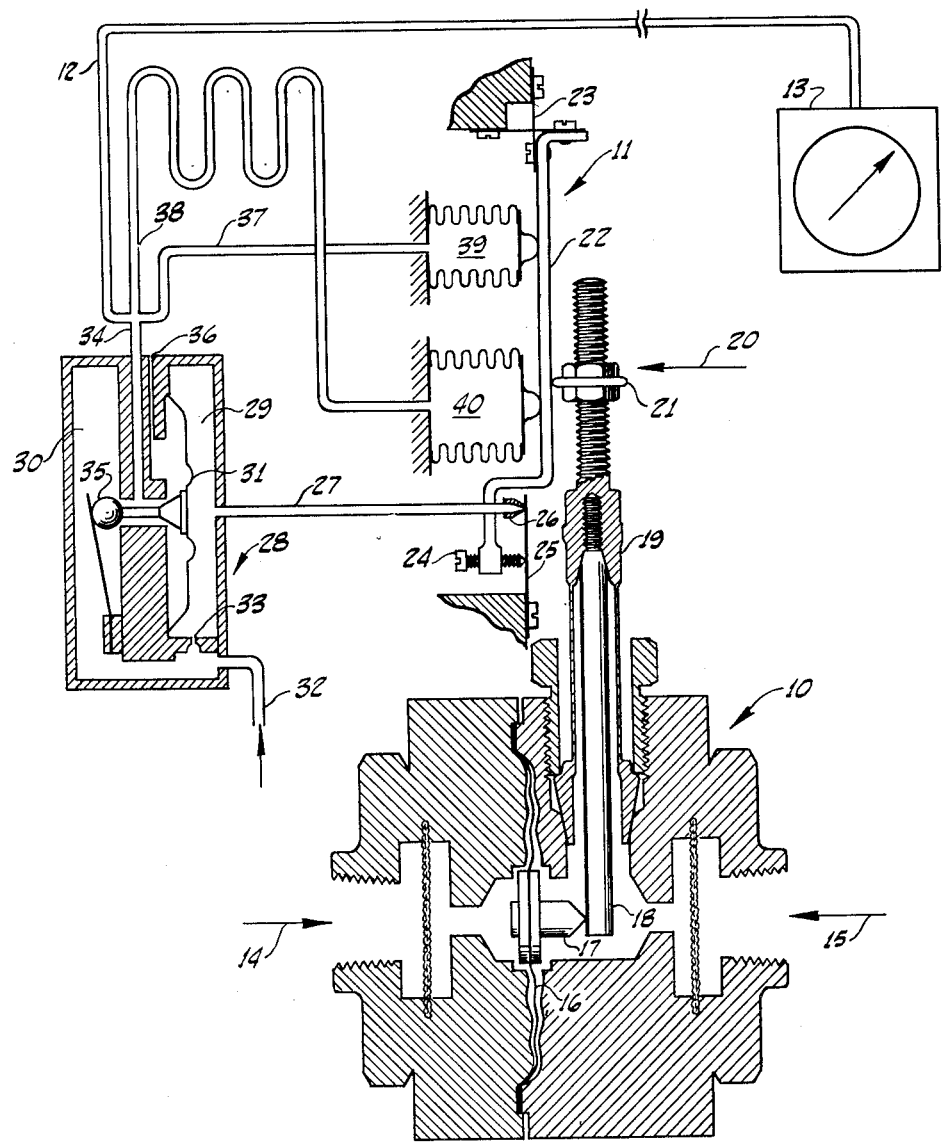
Fig. I

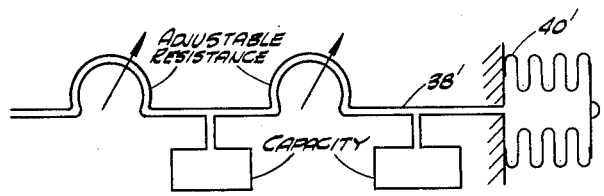
Fig. II
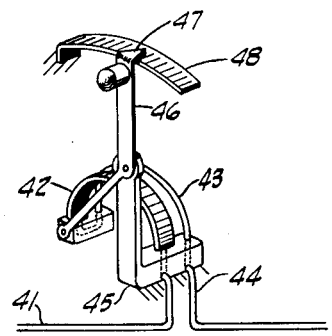
Fig. III
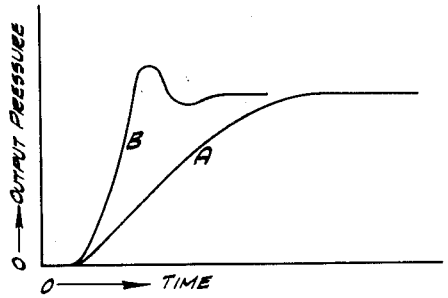
Fig. IV
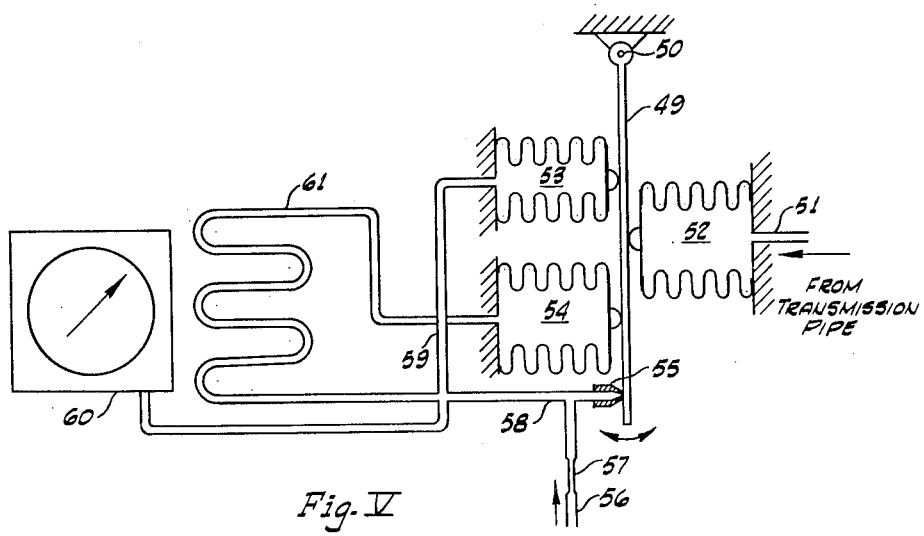
Fig. V

2,658,392

UNITED STATES PATENT OFFICE 2,658,392

PRESSURE INDICATING PNEUMATIC TRANSMISSION SYSTEM

William E. Vannah, Foxboro, Mass., assignor to The Foxboro Company, Foxboro, Mass., a corporation of Massachusetts Application July 20, 1951, Serial No. 237,787

2 Claims. (Cl. 73—407)

This invention relates to pneumatic transmission systems, such as are used with control, recording, and indicating instruments, and has particular reference to time lag effects in such transmission systems.

It is an object of this invention to provide a new and improved pneumatic transmission device.

It is a further object to provide a device for reducing the effect of time lag in a pneumatic transmission system.

Other objects and advantages will be in part obvious and in part pointed out hereinafter. These objects and advantages are attained by the novel methods and apparatus described in the following specification, and they may be more readily understood by reference to the accompanying drawings.

In consideration of pneumatic transmitter and receiver units joined by a pneumatic transmission system, which may simply be a pipe, a pipe and a receiver, or other combinations, the question of whether or not the time delay in the system is undesirable depends upon the time lag which can be tolerated in relation to the particular problem and system involved. In many pneumatic transmission systems and applications, it is important to reduce the effect of such undesirable time lag. Much harm can result if a change in a measured variable is not known very quickly.

In the usual and ordinary pneumatic transmission system of any notable length, the pneumatic signal is undesirably delayed by the combination of the "dead time" lag and the "transfer lag." "Dead time" is the lag due directly to the distance the pneumatic signal is transmitted at a speed proportional to the velocity of sound. "Transfer lag" is the delay caused by the combination of pneumatic resistance, capacity, and inertia in the system. This invention provides a device for reducing the total lag effect, although it accomplishes this by reduction of the transfer lag effect only, which normally constitutes the major part of the total lag effect.

The main thought behind this invention, as applied to a transmitter and receiver combination, joined by a transmission system, is to impart to the receiver, with a minimum delay, the knowledge of the value of the pneumatic signal applied to the transmitter.

The device of this invention in effect measures the pressure at both ends of the transmission system through the use of a dummy transmission as a feed-back device. The transmission system is treated as a process to be controlled. A transmission system can be represented in a practical way by a chain of pneumatic delay circuits. Pneumatic resistance-capacity delay circuits in series may be used, all with equal time constants, but with the resistance increasing in even multiples from input to output, and with capacities decreasing in the same order.

Any type of dummy system may be used if it is in approximate duplication of the transfer lag of the real transmission.

Referring to the drawings:

Figure I is a schematic illustration of a pressure differential indicating instrument including an illustrative embodiment of this invention;

Figure II is an illustration of a pneumatic resistance-capacity arrangement for use in this invention;

Figure III is an illustration of the adjustable resistance of Figure II;

Figure IV is a showing of transmission system time-pressure curves, with and without the use of a device embodying this invention; and Figure V is an illustration of an alternative structure embodying this invention.

In Figure I, the specific disclosure of an embodiment of this invention is in relation as shown centrally and at the bottom of the drawing, to a differential pressure unit 10. Details of structure and operation of this unit are disclosed as a part of Patent No. 2,539,892 to L. Cook, dated January 30, 1951. The output of this unit 10 operates through a pneumatic control assembly 11 different from that of the above mentioned patent, to apply a pneumatic signal to a pneumatic transmission system comprising a transmission pipe 12 and a receiver-indicator 13.

The pressure unit 10 responds to the pressure difference of pressures indicated by arrows 14 and 15 as a representation of a condition upset value. For example, the pressures 14 and 15 may represent the pressure values in a flow pipe line (not shown), upstream and down stream with respect to an orifice plate therein (not shown). The pressure differential is expressed in the movement and position of a diaphragm 16. In turn, the movement of the diaphragm is applied, through a knife-edge finger 17 and a rod 18, to a cantilever tube 19, producing lateral movement in the end of the tube 19 as indicated by the arrow 20. This lateral movement imparts a force to the pneumatic control assembly 11, representative of the pressure differential in the unit 10, i. e., the condition upset, through a ring 21, threaded on the cantilever 19.

In the control assembly 11 there is a baffle arm 22 which is engaged by the cantilever ring 21, and is movable thereby since the baffle arm is mounted at one end on a cross flexure 23 as its only support. This provides, essentially, a pivoted arm, movable about that pivot by the movement of the cantilever 19. The free end of the baffle arm supports a screw 24 for engagement with a flexible baffle 25. A nozzle 26 is located in association with the baffle 25 and the entire assembly is arranged for the closing off of the nozzle 26 by the baffle 25 as the baffle arm 22 is moved clockwise. The nozzle 26 has a connection pipe 27 leading thereto for supplying a pneumatic flow to the nozzle. Thus, movement of the baffle arm 22 with respect to the nozzle 26 provides varying opposition to pneumatic flow therefrom as the resilient baffle 25 moves toward or away from the nozzle.

The nozzle connection pipe 27 connects with a pneumatic relay 28. This relay is of customary form and operation. It is, in this structure, primarily a pneumatic volume amplifier although it does also proportionally amplify pressure. It has a pilot pressure chamber 29 to which the nozzle pipe 27 is connected, and a power pressure chamber 30. These chambers are pneumatically separated by a diaphragm 31. Pneumatic power is supplied to the relay through an input connection 32, leading directly to the power chamber 30 and to the pilot chamber through a restriction 33. An output passage 34 is provided and may be closed off from the power chamber 30 wholly or in part, as a two part, double valve 35, is moved by the diaphragm 31. The output pressure of the relay 28 therefore, is increased as the diaphragm 31 is moved by the back pressure effect resulting from the opposition, by the baffle 25, to pneumatic flow from the nozzle 26. A small passage 36 is provided as a bleed to atmosphere for captive pressures.

There are three pipe connections to the output 34 of the relay 28. One is the transmission pipe 12, leading to the receiver-indicator 13, another is a direct feed-back pipe 37, and the third is an indirect feed-back pipe 38.

As a proportional function arrangement, the direct feed-back pipe 37 leads to a feed-back bellows 39, in position to engage the baffle arm 22, to oppose the cantilever action thereon. The bellows 39 is comparatively small, and engages the baffle arm 22 at a point closer to the flexure pivot 23 than the opposing engagement point of the cantilever ring 21 on the baffle arm 22.

The result of this arrangement and structure is that the control assembly 11 reacts to the closing off of the nozzle 26 by initially producing a proportional output pressure surge which is large in relation to the condition upset pressure as applied to the baffle arm 22 through the cantilever arm 19. This large pressure develops to maintain a balance in the baffle arm 22. This is a pneumatic pressure amplification resulting from the position and dimension of the bellows 39, that is, its moment-area relation to the baffle arm 22, and is distinct from the volume amplification through the relay 28. Figure V shows a structure without a relay, but nevertheless having the initial pressure amplification, as will be explained later herein.

Because of the relatively small size of the bellows 39 and its moment relation to the force applied by the cantilever 19, an initial rebalance of the system requires a pressure in bellows 39 substantially greater than the pressure resulting in the force applied by the cantilever.

This amplified pressure, including the amplification by the relay 28, is applied to the transmission pipe 12. The primary purpose of this whole device is to bring home to the indicator 13, knowledge of the pressure value as applied to the baffle arm 22 by the cantilever 19, in the shortest possible time, within practical limits. This is accomplished by reduction of the transfer lag effect.

In Figure IV, curves A and B represent pressures at the indicator 13. As shown in curve A, without the amplified initial pressure, there is a substantial time lag in getting this knowledge to the indicator. Curve B illustrates the result of the initial pressure amplification, or surge, which is substantially in excess of the actual pressure applied to the baffle arm 22 through the cantilever 19 and also substantially in excess of the actual pressure which is to be applied to the indicator 13. This excess pressure, applied at the input of the transmission system, accelerates the transfer of the applied pressure 20, or a different pressure in desired relation to the applied pressure, to the indicator 13. By calculation, by the time the pneumatic signal reaches the indicator 13 it is equal to or desirably proportional to, the applied pressure 20.

Thus the primary purpose is accomplished, and the transfer lag effect substantially reduced. But there must be more to the system, or the full overpressure of the first surge will be applied to the indicator, in an erroneous representation of the applied pressure 20, or simply as a greater amplification which is delayed in its full expression in the indicator 13.

To avoid this, and as a rate responsive function arrangement, the feed-back pipe 38 is provided with a bellows 40 in termination, the bellows being arranged to engage the baffle arm 22 in opposition to the applied pressure 20. The pipe 38 and bellows 40 are formed with such pneumatic capacity and resistance characteristics that, in combination with the inertia of the pneumatic fluid used, usually air, a feed-back system is provided which approximately duplicates the transfer lag effects of the transmission system including pipe 12 and receiver-indicator 13.

The action of the device, therefore, is to impose an initial, over amplified pressure on the transmission pipe 12 through the action of the bellows 39 and thereafter, with a delay essentially equal to the transmission system dead time, to reduce the over-amplified pressure to a desired level by applying indirect feed back through the dummy transmission system of pipe 38 and bellows 40 so that the nozzle 26 and the baffle 25 achieve a new balance of position, with the moment-area combination of bellows 39 and 40 matching the applied pressure 20. With this arrangement, the over-amplification of pressure is bled off through the nozzle 26 as the new nozzle-baffle balance is achieved. The sum of the moment-area products of the bellows 39 and 40 is equal to the moment of the initiating force applied by the cantilever 19, so that the output pressure of the device is equal to the initiating pressure in steady state, with forces balanced.

Referring to Figure II, a feed-back system is shown, composed of adjustable pneumatic resistance-capacity combinations which form, with a pipe 38' and a bellows 40', a feed back for substitution for the Figure I feed-back system of pipe 38 and bellows 40. The system of Figure II may be used where it is impractical to actually try to duplicate the Figure I transmission pipe 12.

Although, in Figure II, two sets of pneumatic resistance-capacity combinations are shown, a single set may be used, or more than two sets, to meet the needs of a particular situation. No attempt is made to duplicate the dead time factor, and the transfer lag is duplicated only to a degree which is reasonable as a practical matter.

Figure III shows the detail of an adjustable pneumatic resistance as indicated in Figure II. There is an input pipe 41 leading to a Bourdon tube 42. A pipe 43 is connected to the outer end of the Bourdon and curved back, following the contour of the Bourdon, to an output pipe 44. The near end of the Bourdon and the pipe 43 are supported in a bracket 45. A bell crank 46 is pivotally supported on the bracket 45, with one end connected to the far end of the Bourdon and the other end terminating in a pointer 47 in association with an indicating scale 48. Adjustment of the resistance by moving the bell crank is accomplished because bending of the Bourdon changes the pneumatic flow therethrough by changing the cross section of the Bourdon to change the pneumatic flow therethrough.

In Figure I, and in the description thereof, consideration has been given to the use of a transmitter-receiver combination joined by a transmission system, or pipe, with the pneumatic control device of this invention associated with the transmitter. In such an arrangement it is necessary to use a pneumatic relay, as shown at 28, primarily to give the extra volume amplification needed to provide the initial pressure surge to carry the desired signal the length of the transmission system substantially without transfer lag effect.

The control device may be located, as is sometimes desirable, at the receiver end of the pneumatic transmission system. Figure V is a showing of such an arrangement. The difference from the structure of Figure I is in the absence of a pneumatic relay. None is needed, because there is no further transmission pipe along which a signal must be pushed any appreciable distance, and the bellows size and arrangement provides the necessary initial pressure amplification in response to the attenuated signal received at the end of the transmission pipe. Through the proportion and rate function embodied in the structure and arrangement of feed back and baffle arm, the proper pressure over-amplification is applied to the receiver-indicator, essentially eliminating the transfer lag effect of the transmission system or pipe through which the pneumatic signal has traveled before reaching the control device of this invention at the receiver. In such a case there is no such control device at the transmitter.

Referring to Figure V, a baffle arm 49 is pivotally mounted at 50. At the right of the arm 49 is a pipe 51 carrying the pneumatic signal from the transmitter (not shown). This pipe 51 terminates in a bellows 52, which engages the baffle arm to impart movement thereto as the incoming signal moves the bellows. On the opposing side of the baffle arm 49 is a direct feed-back bellows 53, an indirect feed-back bellows 54, and a nozzle 55, in structure, arrangement, and function, like the device of Figure I.

The nozzle 55 is supplied with a pneumatic flow by way of a power supply pipe 56 having a restriction 57 therein, and the baffle arm 49 is moved by the bellows 52 with respect to the nozzle to provide varying opposition to the pneumatic flow therefrom.

The "output" of the device is the back pressure, in a pipe 58 leading to the nozzle 55, when the nozzle is closed off, partially or wholly, by the baffle arm 49. Upon the closing of the nozzle, the initial back pressure surge is applied to the bellows 53 through the direct feed-back pipe 59. The initial pressure surge is also applied directly to the adjacent indicator 60 through the output pipe 58. Then, as in the Figure I structure, the excess amplification is bled off through the nozzle 55 because of the action of the indirect feed-back bellows 54 which is connected to the output pipe 58 by a transmission pipe 61, which is formed to approximately duplicate, with the bellows 54, the transfer lag of the transmission system including the pipe 51 and the bellows 52, which carry the incoming pneumatic signal.

The signal from the transmitter (not shown), although attenuated, reaches the bellows 52 with a delay due only to dead time. Thereafter this signal is calculatedly amplified to the transmitter value and impressed directly and immediately on the indicator 60. Therefore the main purpose of the invention is again accomplished; i. e., the knowledge of the input signal value is given to the indicator with a minimum of delay.

If desired, the feed-back system of Figure II may be used instead of the system including the pipe 61 and bellows 54. The device of this invention may be used at any point in a transmission system. It can also be built into other elements of control, for example, elements of proportioning and compensating.

This invention, therefore, embodies a pneumatic control device which first overamplifies an incoming signal and thereafter balances out at the lower, desired signal value, by using a feedback system in approximate duplication of the transfer lag effects of the transmission system.

I claim:

1. A measuring instrument pneumatic system comprising in combination; a pneumatic transmitter including a nozzle, means for connecting said nozzle with a pneumatic power supply, a pivoted baffle for receiving the force from an applied pressure and movable thereby with respect to said nozzle to provide varying opposition to pneumatic flow therefrom, and a pneumatic relay connected to said nozzle; a bellows connected to the output of said relay for moving said baffle in amplification of and in opposition to said applied pressure in response to back pressure effect in said relay resulting from said flow opposition, a pneumatic indicator-receiver located at a substantial distance from said transmitter, a long transmission pipe connecting the output of said transmitter relay and said receiver, and a pneumatic feed-back system between the output of said transmitter relay and said baffle, said feedback system comprising a series arrangement of a pair of time constant assemblies each having a pneumatic resistance followed by a fixed pneumatic capacity, said assemblies having equal time constant values with the pneumatic resistance values thereof increasing from input to output and the pneumatic capacity values thereof decreasing in like order, and a variable pneumatic capacity unit following said series of assemblies in the form of a bellows for engaging said baffle in opposition to said applied pressure, with said feed-back system being proportioned to have transfer lag in approximate duplication of the transfer lag of said long transmission pipe.

2. In a measuring instrument, a differential pressure pneumatic transmitter having an arm movable in response to the differential of two pressures, a pivoted baffle for engagement with said arm and movable thereby, and a nozzle in association with said baffle with pneumatic flow therefrom provided by a pneumatic power supply with the flow from said nozzle variable by said movement of said baffle and with the output of said transmiter resulting from back pressure effect from said nozzle, a long pneumatic transmission pipe with one end connected to the output of said transmitter, a pneumatic receiver located at a substantial distance from said transmitter and having a bellows therein connected to the other end of said long transmission pipe, said receiver further having a pivoted baffle for engagement with said receiver bellows and movable thereby, and a nozzle in association with said receiver baffle with pneumatic flow therefrom provided by a pneumatic power supply with the flow from said receiver nozzle variable by said movement of said receiver baffle and with the output of said receiver resulting from back pressure effect from said receiver nozzle, a triple pipe output from said receiver, a pneumatic indicator connected to one of said output pipes, a bellows connected to another of said output pipes for moving said receiver baffle in amplification of, and in opposition to, pressure applied to said transmission pipe receiver bellows through said transmission pipe, and a pneumatic feed-back system from the third of said output pipes to said receiver baffle, said feed-back system comprising a series arrangement of a pair of time constant assemblies each having a pneumatic resistance followed by a fixed pneumatic capacity, said assemblies having equal time constant values with the pneumatic resistance values thereof increasing from input to output and the pneumatic capacity values thereof decreasing in like order, and a variable pneumatic capacity unit following said series of assemblies in the form of a bellows for the pressure at the output of said feed back system on said receiver baffle in opposition to said transmission pipe pressure, with said feed-back system being proportioned to have transfer lag in approximate duplication of the transfer lag of said long transmission pipe and said transmission pipe receiver bellows.

WILLIAM E. VANNAH.

References Cited in the file of this patent

UNITED STATES PATENTS

| Number | Name | Date |
|---|---|---|
| 2,409,871 | Krogh | Oct. 22, 1946 |
| 2,476,104 | Mason | July 12, 1949 |
| 2,539,892 | Cook | Jan. 30, 1951 |